(12) United States Patent
Kim et al.

(10) Patent No.: US 9,609,726 B2
(45) Date of Patent: Mar. 28, 2017

(54) APPARATUS AND METHOD FOR PROVIDING INDOOR LOCATION INFORMATION USING LIGHTING CONTROL NETWORK

(71) Applicant: Electronics and Telecommunications Research Institute, Daejeon (KR)

(72) Inventors: In-Su Kim, Daejeon (KR); Hyun-Chul Kang, Daejeon (KR); Hyun-Joo Kang, Daejeon (KR); Seong-Hee Park, Daejeon (KR); Jung-Sik Sung, Daejeon (KR); Jong-Woo Choi, Daejeon (KR); Tae-Gyu Kang, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 147 days.

(21) Appl. No.: 14/622,374

(22) Filed: Feb. 13, 2015

(65) Prior Publication Data

US 2015/0230322 A1  Aug. 13, 2015

(30) Foreign Application Priority Data

Feb. 13, 2014 (KR) .................. 10-2014-0016603

(51) Int. Cl.
*B60R 25/33* (2013.01)
*H05B 37/02* (2006.01)

(52) U.S. Cl.
CPC ......... *H05B 37/0272* (2013.01); *B60R 25/33* (2013.01)

(58) Field of Classification Search
USPC ............ 340/825.36, 825.37, 825.49, 825.52, 340/825.69, 825.72, 825.71
See application file for complete search history.

(56) References Cited

U.S. PATENT DOCUMENTS

| 7,650,233 | B2 * | 1/2010 | Motoyama | G01S 5/0027 701/484 |
| 2008/0316091 | A1 * | 12/2008 | Wigren | G01S 19/256 342/357.64 |
| 2009/0164174 | A1 * | 6/2009 | Bears | G01D 4/00 702/188 |
| 2012/0146804 | A1 | 6/2012 | Kim et al. | |

FOREIGN PATENT DOCUMENTS

| KR | 100957537 A | 5/2010 |
| KR | 101118673 A | 3/2012 |

* cited by examiner

*Primary Examiner* — Tuyet Vo
(74) *Attorney, Agent, or Firm* — William Park & Associates Ltd.

(57) ABSTRACT

An apparatus and method for providing indoor location information are disclosed herein. The apparatus includes a signal reception unit, a global positioning system (GPS) data reception unit, a frame generation unit, a scheduling unit, and a signal transmission unit. The signal reception unit receives a lighting control frame from a lighting control device. The GPS data reception unit receives location data from GPS satellites. The frame generation unit generates a location data frame by extracting the location of an illumination light stored in a lighting arrangement storage unit, modifying the location data and adding a header to the modified location data. The scheduling unit schedules the lighting control frame or the location data frame. The signal transmission unit transfers the lighting control frame or the location data frame to the corresponding illumination light based on the results of the scheduling of the scheduling unit.

6 Claims, 6 Drawing Sheets

APPARATUS AND METHOD FOR PROVIDING INDOOR LOCATION INFORMATION USING LIGHTING CONTROL NETWORK

CROSS-REFERENCE TO RELATED APPLICATION

This application claims the benefit of Korean Patent Application No. 10-2014-0016603, filed Feb. 13, 2014, which is hereby incorporated by reference herein in its entirety.

BACKGROUND

1. Technical Field

Embodiments of the present invention relates generally to an apparatus and method for providing indoor location information using a lighting control network and, more particularly, to an apparatus and method for providing location information that are capable of transmitting indoor location information via visible light communication (VLC) using an existing lighting control network without changing existing network components.

2. Description of the Related Art

With an increase in the usage of lighting devices using a light-emitting diode (LED), i.e., a semiconductor device capable of transferring information via visible light, as a light source, service for transferring information via lighting devices has been provided.

As described above, a visible light communication ("VLC") system using LED lighting refers to a system that transfers information using visible light emitted from LED lighting. One of the features of VLC is that data can be transmitted within a range in which visible light can arrive. Based on this feature, it is possible to determine a current location using the visible light of an illumination light whose location is fixed.

Currently, network technology has been widely used to control lighting. Basically, a lighting control network can transmit lighting control signals. This lighting control network can be used to transfer location information using VLC. For example, Korean Patent Application Publication No. 2009-0090540 entitled "Method of Providing Location-Based Service in Shadow Area, and System, Lighting Device and Mobile Communication Terminal therefor" discloses technology for providing location-based service using the information of a lighting device installed in a building.

A method using global positioning system (GPS) signals can be used to determine a location. However, a problem arises in that GPS signals cannot be received within a closed space having a ceiling. Furthermore, since GPS signals provide relatively low-accurate altitude measurement values, another technology capable of compensating for this defect is required. This may cause many problems in an indoor space that is frequently constructed in multiple layers.

Accordingly, in order to overcome these problems, there is a need for technology that is capable of providing indoor location information using a lighting control network.

SUMMARY

Embodiments of the present invention are directed to the provision of an apparatus and method for providing location information that are capable of transmitting indoor location information via VLC using an existing lighting control network without changing existing network components.

In accordance with an aspect of the present invention, there is provided a method of providing indoor location information, including checking whether an apparatus for providing indoor location information has received a lighting control frame from a lighting control device; if the lighting control frame has been received, transferring the lighting control frame to a corresponding illumination light; if the lighting control frame has not been received, receiving location data; checking whether coordinates of the apparatus for providing indoor location information have been updated, and generating a different location data frame based on results of the checking; and providing the location data frame to the corresponding illumination light.

Generating the location data frame may include checking whether the coordinates of the apparatus for providing indoor location information have been updated by checking whether the previously set coordinates of the apparatus for providing indoor location information matches the location data.

Generating the location data frame may include, if the coordinates of the apparatus for providing indoor location information have been updated, extracting the lighting control network protocol ID and installation location of an illumination light; calculating a latitude and a longitude based on the installation location of the illumination light, and modifying the location data based on the results of the calculation; and generating the location data frame by adding a header to the modified location data.

The lighting control network protocol ID may be used as the destination of the header.

Generating the location data frame may include, if the coordinates of the apparatus for providing indoor location information have not been updated, extracting a time value from the location data; and generating a time synchronization frame using the time value.

In accordance with another aspect of the present invention, there is provided an apparatus for providing indoor location information, including a signal reception unit configured to receive a lighting control frame from a lighting control device; a global positioning system (GPS) data reception unit configured to receive location data from GPS satellites; a frame generation unit configured to generate a location data frame by extracting the location of an illumination light stored in a lighting arrangement storage unit, modifying the location data and adding a header to the modified location data; a scheduling unit configured to schedule the lighting control frame or the location data frame; and a signal transmission unit configured to transfer the lighting control frame or the location data frame to the corresponding illumination light based on the results of the scheduling of the scheduling unit.

The header may include the lighting control network protocol ID of an illumination light extracted by the lighting arrangement storage unit.

The lighting arrangement storage unit may include information about physical installation locations of all illumination lights present on a lighting control network.

The frame generation unit, if the GPS data reception unit has received location data, may check whether its coordinates have been updated, and may generate a different location data frame based on results of the checking.

The frame generation unit, if the coordinates have been updated, may generate the location data frame by calculating a latitude and a longitude based on the installation location of the illumination light, modifying the location data based on results of the calculation, and adding a header to the modified location data.

The frame generation unit, if the coordinates have not been updated, may extract a time value from the location data, and may generate a time synchronization frame using the time value.

In accordance with still another aspect of the present invention, there is provided a location lighting device, including a reception unit configured to receive a control frame from an apparatus for providing indoor location information; a determination unit configured to determine whether the control frame is a lighting control frame or a location data frame; a lighting control frame processing unit configured to process the lighting control frame; a location data frame processing unit configured to extract location data from the location data frame and to store the extracted location data in memory; and a transmission unit configured to transmit the control frame if the control frame is bound for a different location lighting device as its destination.

The lighting control frame processing unit, if the control frame corresponds to a lighting control frame, may perform a lighting control operation corresponding to the lighting control.

The location data frame processing unit, if the control frame corresponds to a location data frame, may generate a visual light communication (VLC) frame for visible light transmission.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Embodiments of the present invention will be described in detail below with reference to the accompanying drawings. Repeated descriptions and descriptions of well-known functions and configurations that have been deemed to make the gist of the present invention unnecessarily obscure will be omitted below. The embodiments of the present invention are intended to fully describe the present invention to persons having ordinary knowledge in the art to which the present invention pertains. Accordingly, the shapes, sizes, etc. of components in the drawings may be exaggerated to make the description obvious.

An apparatus and method for providing indoor location information using a lighting control network according to embodiments of the present invention are described in detail below with reference to the accompanying drawings.

Figure 1:
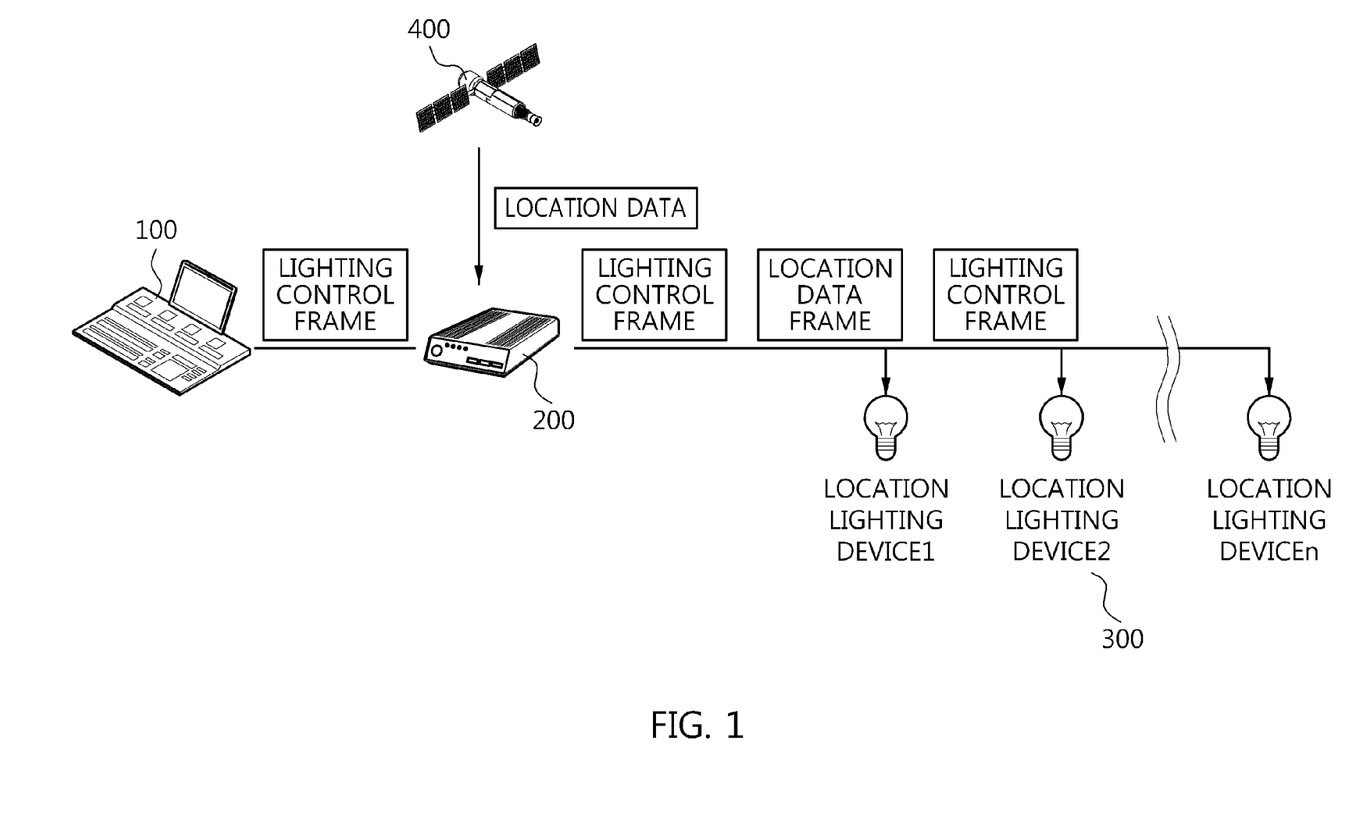
FIG. 1 is a diagram of an environment to which an apparatus for providing indoor location information using a lighting control network according to an embodiment of the present invention is applied.

FIG. 1 is a diagram of an environment to which an apparatus for providing indoor location information using a lighting control network according to an embodiment of the present invention is applied.

Referring to FIG. 1, in a lighting control network, a lighting control device 100, an apparatus 200 for providing indoor location information, one or more location lighting devices 1 to n 300, and GPS satellites 400 are included.

The lighting control device 100 generates a lighting control frame adapted to control the basic function of lighting, and transmits the generated lighting control frame to a corresponding one of the one or more location lighting devices 1 to n 300 over the lighting control network.

The apparatus 200 for providing indoor location information is located between the lighting control device 100 and the one or more location lighting devices 1 to n 300, and functions to transmit the lighting control frame, received from the lighting control device 100, to the corresponding location lighting device and to receive location data from the GPS satellites 400, convert the location data into a location data frame that can pass through the lighting control network, and then transmit the location data frame to the location lighting devices.

Each of the one or more location lighting devices 1 to n 300 (hereinafter also referred to as the "location lighting devices 300") is a lighting device that may receive a lighting control frame from the lighting control device 100 and be then controlled and that has a function capable of transmitting location information via visible light using a VLC function when necessary.

The location lighting devices 300 and the apparatus 200 for providing indoor location information according to an embodiment of the present invention are connected over the lighting control network.

Next, the apparatus 200 for providing indoor location information is described in detail with reference to FIG. 2.

Figure 2:
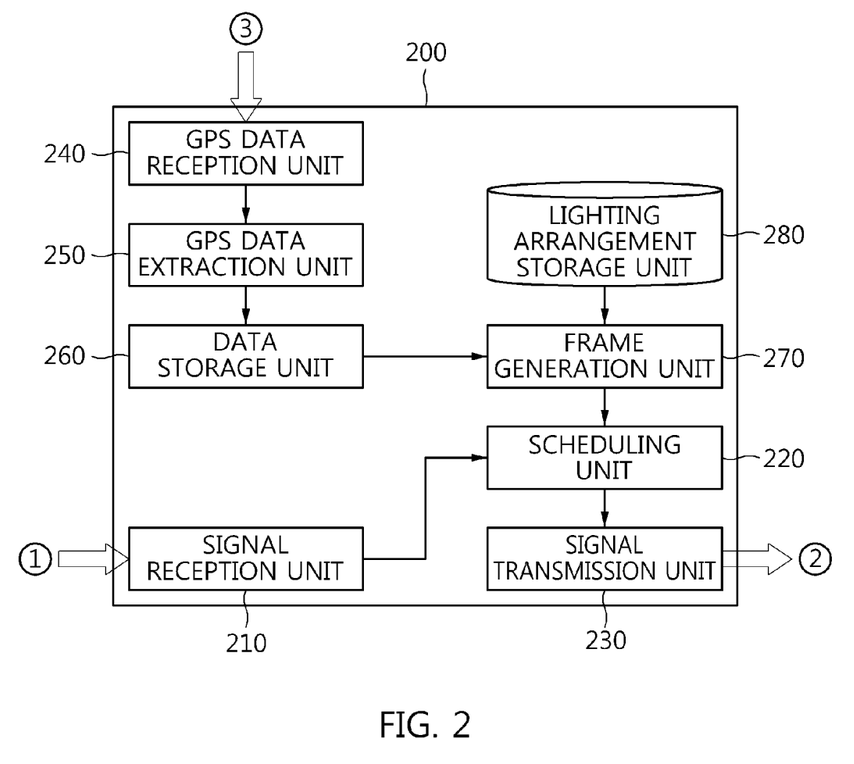
FIG. 2 is a diagram illustrating the schematic configuration of an apparatus for providing indoor location information using a lighting control network according to an embodiment of the present invention.

FIG. 2 is a diagram illustrating the schematic configuration of an apparatus for providing indoor location information using a lighting control network according to an embodiment of the present invention.

Referring to FIG. 2, the apparatus 200 for providing indoor location information includes a signal reception unit 210, a scheduling unit 220, a signal transmission unit 230, a GPS data reception unit 240, a GPS data extraction unit 250, a data storage unit 260, a frame generation unit 270, and a lighting arrangement storage unit 280.

The signal reception unit 210 receives a lighting control frame from the lighting control device (100 of FIG. 1) via the input line ① of FIG. 2) of the lighting control network.

The scheduling unit 220 schedules the lighting control frame or the location data frame received from the signal reception unit 210 or the frame generation unit 270.

The signal transmission unit 230 transmits the lighting control frame or the location data frame via the output line ② of FIG. 2) of the lighting control network based on the results of the scheduling of the lighting control network scheduling unit 220.

The GPS data reception unit 240 receives the location data from the GPS satellites (400 of FIG. 1) via a GPS interface ③ of FIG. 2).

The GPS data extraction unit 250 stores the location data, received by the GPS data reception unit 240, in the data storage unit 260.

The frame generation unit 270 generates a location data frame by extracting the location of a single location lighting device 300 from the lighting arrangement storage unit 280, modifying location data present in the data storage unit 260 and then adding a header that can pass through the lighting control network. In this case, the header includes the lighting control network protocol ID of a corresponding location lighting device extracted from the lighting arrangement storage unit 280. Furthermore, the frame generation unit 270 makes setting such that the location data frame can be transferred to only a corresponding location lighting device.

The frame generation unit 270 sequentially reads the locations of the location lighting devices and then performs the above operation until the location data frame is transferred to all the location lighting devices 300 inside the lighting arrangement storage unit 280.

The lighting arrangement storage unit 280 includes the physical installation location information of all the location lighting devices 300 present on the lighting control network. In this case, the installation location information includes locations relative to the apparatus 200 for providing indoor location information, or the absolute coordinates of the location lighting devices 300.

Next, a method of providing indoor location information using a lighting control network is described in detail with reference to FIG. 3.

Figure 3:
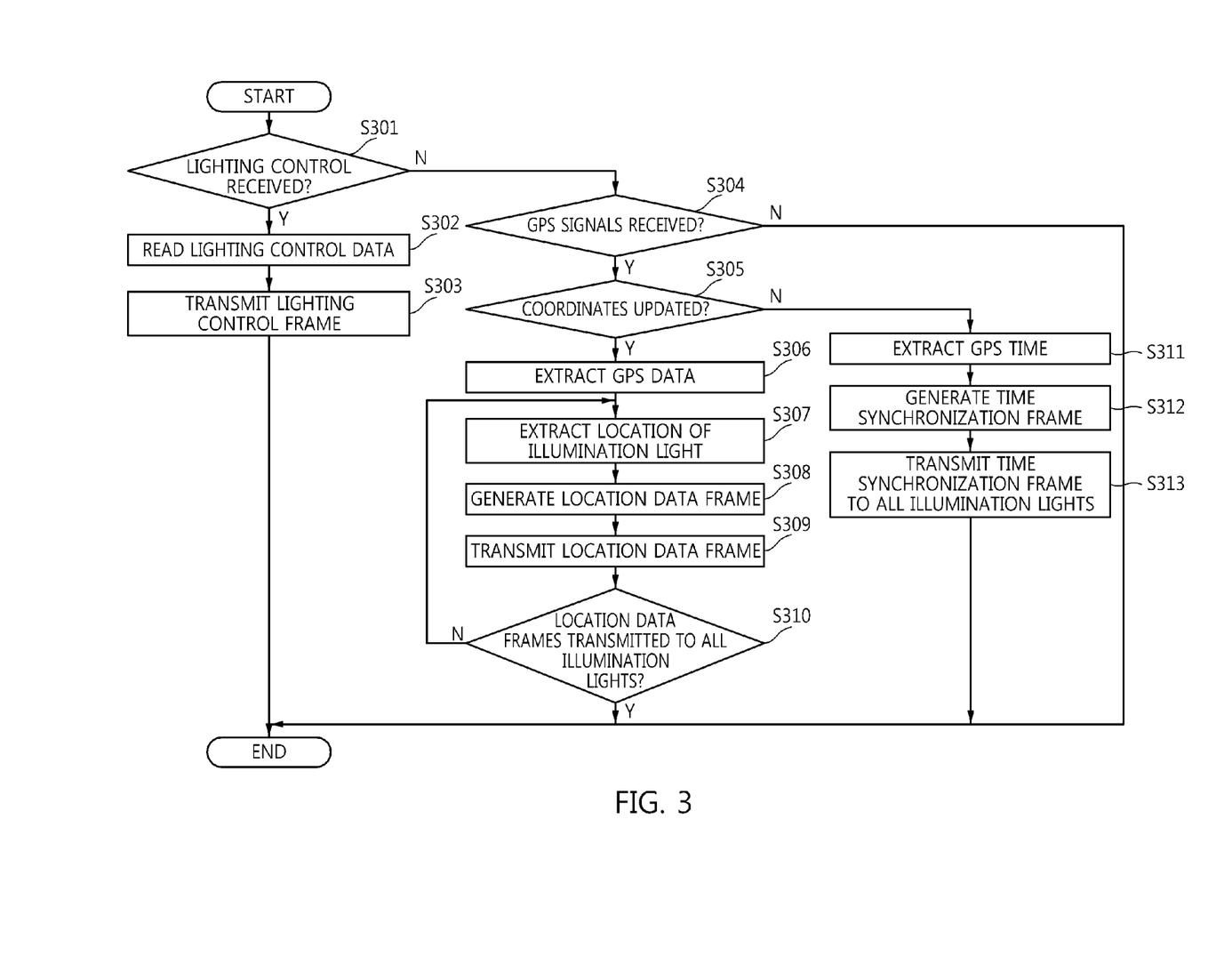
FIG. 3 is a flowchart of a method of providing indoor location information using a lighting control network according to an embodiment of the present invention.

FIG. 3 is a flowchart of a method of providing indoor location information using a lighting control network according to an embodiment of the present invention.

Referring to FIG. 3, the scheduling unit 220 of the apparatus 200 for providing indoor location information checks whether the signal reception unit 210 has received a lighting control frame at step S301.

If the signal reception unit 210 has received a lighting control frame, the scheduling unit 220 analyzes lighting control data in the lighting control frame at step S302, and schedules and transmits the lighting control frame based on the results of the analysis at step S303.

If the signal reception unit 210 has not received a lighting control frame, the scheduling unit 220 checks whether there are GPS signals received from the GPS satellites (400 of FIG. 1) at step S304.

If there are GPS signals received from the GPS satellites (400 of FIG. 1), the frame generation unit 270 checks whether the coordinates of the apparatus 200 for providing indoor location information have been updated by checking whether the currently set coordinates of the apparatus 200 for providing indoor location information matches the location data received from the GPS satellites (400 of FIG. 1) at step S305.

If it is determined at step S305 that the coordinates have been updated, that is, if the coordinates of the apparatus 200 for providing indoor location information have not been set or if the coordinates of the apparatus 200 for providing indoor location information do not match the location data received from the GPS satellites (400 of FIG. 1), the frame generation unit 270 extracts all the location data received from the GPS satellites (400 of FIG. 1) at step S306.

In order to transmit the location data extracted at step S306 to each of the location lighting devices, the frame generation unit 270 sequentially extracts lighting control network protocol IDs and installation locations from the lighting arrangement storage unit 280 at step S307.

The frame generation unit 270 generates a location data frame by calculating a latitude and a longitude based on the installation location of each location lighting device, modifying the location data received from the GPS satellites based on the results of the calculation, and adding a header that can pass through the lighting control network at step S308.

The signal transmission unit 230 unicasts the location data frame, generated at step S308, to the corresponding location lighting device at step S309.

The scheduling unit 220 checks whether location data frames have been transmitted to all location lighting devices stored in the lighting arrangement storage unit 280 at step S310, and repeats steps S307 to S309 with respect to a location lighting device to which a location data frame has not been transmitted yet. If location data frames have been transmitted to all location lighting devices stored in the lighting arrangement storage unit 280, the scheduling unit 220 terminates.

If it is determined at step S305 that the coordinates have not been updated, that is, if the coordinates of the apparatus 200 for providing indoor location information match the location data received from the GPS satellites (400 of FIG. 1), the frame generation unit 270 extracts a time value from the location data at step S311.

The frame generation unit 270 converts the time value extracted at step S311 into a time synchronization frame similar to the location data frame at step S312.

The signal transmission unit 230 broadcasts the time synchronization frame to all the lighting devices present on the network at step S313.

Next, a process of generating a location data frame, as in steps S307 and S308, in the method of providing indoor location information using a lighting control network is described in detail with reference to FIG. 4.

Figure 4:
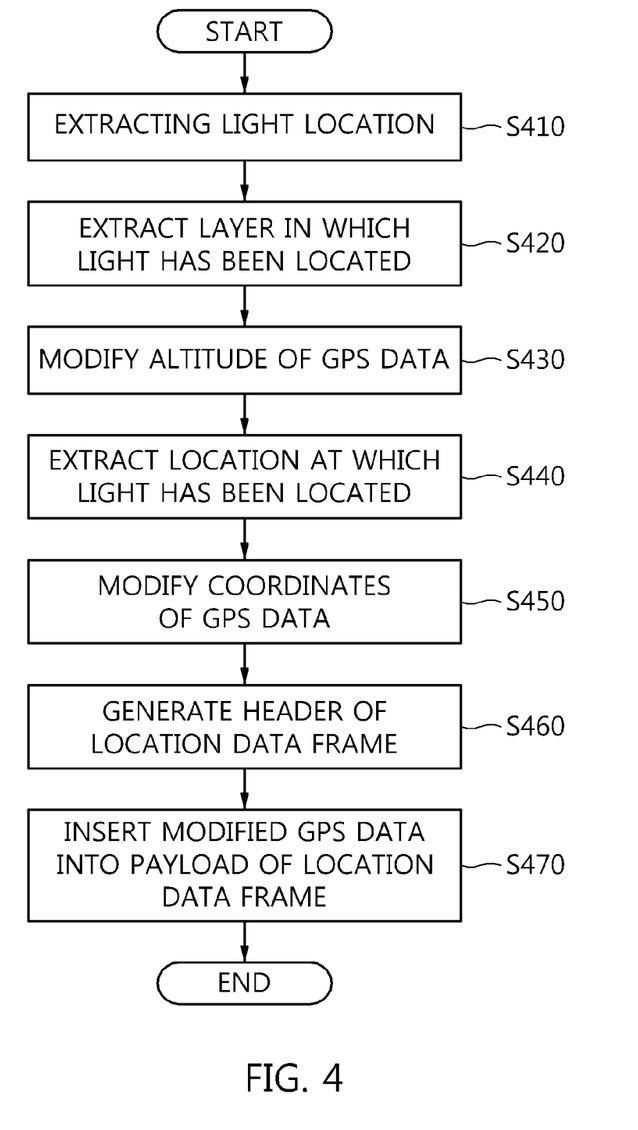
FIG. 4 is a flowchart of a process of generating a location data frame in a method of providing indoor location information using a lighting control network according to an embodiment of the present invention.

FIG. 4 is a flowchart of a process of generating a location data frame in a method of providing indoor location information using a lighting control network according to an embodiment of the present invention.

Referring to FIG. 4, the frame generation unit 270 extracts the lighting control network protocol ID and physical installation location of a location lighting device to or for which location information should be newly assigned or updated from the lighting arrangement storage unit 280 at step S410.

In order to set the accurate altitude information of the corresponding location lighting device in location data, the frame generation unit 270 calculates an altitude based on information about a layer in which the corresponding location lighting device has been installed at step S420.

The frame generation unit 270 inserts the altitude calculated at step S420 into the location data at step S430.

In order to calculate the accurate coordinates of the corresponding location lighting device, the frame generation unit 270 extracts a location in a building or physical coordinates where the corresponding location lighting device has been installed from the lighting arrangement storage unit 280 and then recalculates the extracted result as a latitude and a longitude at step S440.

The frame generation unit 270 inserts the latitude and longitude, recalculated at step S440, into the location data at step S450.

At step S460, the frame generation unit 270 generates the header of a location data frame that is used to transfer the location data to the location lighting device that will receive the location data in which the latitude, longitude and altitude have been newly calculated. In this case, the ID of the location lighting device on the lighting control network, including the recalculated latitude, longitude and altitude, is used as the destination of the header of the location data frame.

The frame generation unit 270 completes the generation of the location data frame by inserting the modified location data behind the header location data frame generated at step S460 as a payload at step S470.

Next, the location lighting device 300 is described in detail with reference to FIG. 5.

Figure 5:
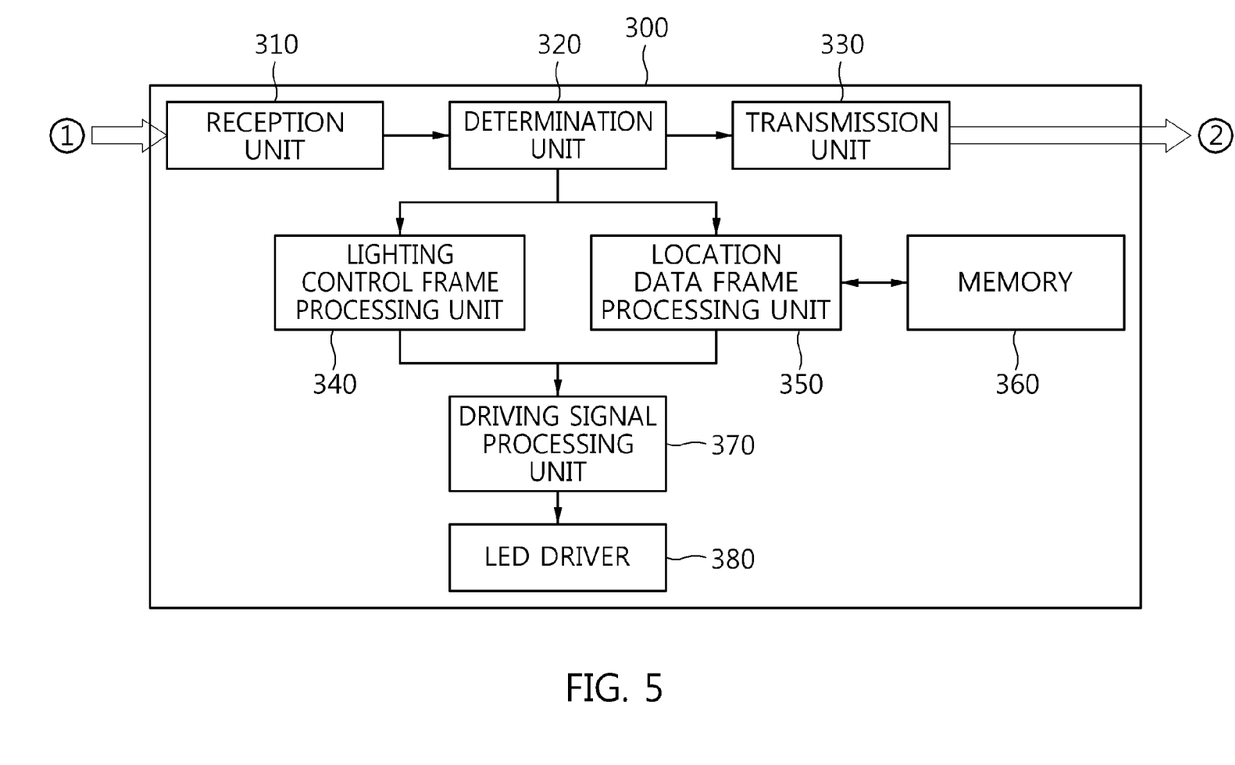
FIG. 5 is a diagram illustrating the schematic configuration of a location lighting device according to an embodiment of the present invention.

FIG. 5 is a diagram illustrating the schematic configuration of a location lighting device 300 according to an embodiment of the present invention.

Referring to FIG. 5, the location lighting device 300 includes a reception unit 310, a determination unit 320, a transmission unit 330, a lighting control frame processing unit 340, a location data frame processing unit 350, memory 360, a driving signal processing unit 370, and an LED driver 380.

The reception unit 310 receives a control frame from the input line ① of the lighting control network.

The determination unit 320 determines whether the control frame received by the reception unit 310 is a frame that is bound for the corresponding location lighting device as its destination.

The determination unit 320 transfers the control frame to the transmission unit 330 if the control frame is not a frame that is bound for the corresponding location lighting device as its destination, and determines the type of frame according to a lighting control network operation method if the control frame is not a frame that is bound for the corresponding location lighting device as its destination.

The determination unit 320 transfers a lighting control frame to the lighting control frame processing unit 340 and a location data frame to the location data frame processing unit 350 based on the results of the determination of the type of frame.

The transmission unit 330 transmits the control frame, received from the determination unit 320, via the output line ② of the lighting control network.

The lighting control frame processing unit 340 controls the location lighting device based on the control data inside the lighting control frame. In this case, the data of the control data that is intended to control an LED light source is transferred to the LED driver 380 via the driving signal processing unit 370, and is used to control a light source.

The location data frame processing unit 350 extracts location data from the location data frame, and stores the extracted location data in the memory 360. In this case, the stored location data is modulated by the driving signal processing unit 370, and is then transmitted as a VLC frame via the LED driver 380.

Next, a process of performing processing when a location lighting device receives a frame bound for the location lighting device itself as its destination is described in detail with reference to FIG. 6.

Figure 6:
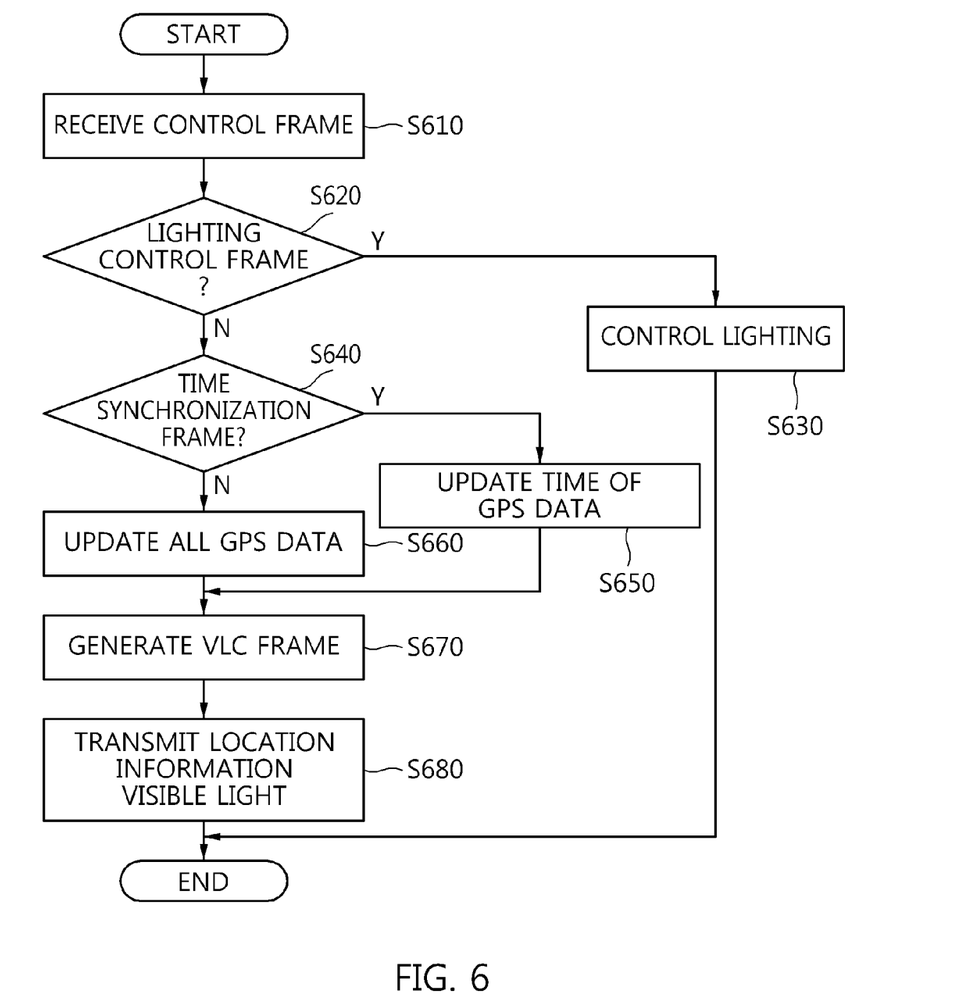
FIG. 6 is a flowchart of a process of performing processing when a location lighting device receives a frame bound for the location lighting device itself as its destination according to an embodiment of the present invention.

FIG. 6 is a flowchart of a process of performing processing when a location lighting device receives a frame bound for the location lighting device itself as its destination according to an embodiment of the present invention.

Referring to FIG. 6, the determination unit 320 of the location lighting device 300 receives a control frame via the reception unit 310 at step S610.

The determination unit 320 checks whether the received control frame is a lighting control frame. If the control frame corresponds to a lighting control frame, the determination unit 320 performs a lighting control operation corresponding to the lighting control frame at step S630.

If the control frame is not a lighting control frame but a location data frame, the determination unit 320 checks whether the control frame is a time synchronization frame having only time information or a frame including coordinates at step S640.

If it is determined at step S640 that the control frame is a time synchronization frame, the determination unit 320 updates the time of location data stored by the location lighting device at step S650.

If it is determined at step S640 that the control frame is a frame including coordinates, the determination unit 320 updates all the time, latitude, longitude and altitude values of the location data stored by the location lighting device at step S660.

At step S670, the determination unit 320 generates a VLC frame for visible light transmission after the update of the location data inside the memory has been completed at step S650 or S660. In this case, the VLC frame includes location data.

The location lighting device 300 may transfer the location information via visible light by transmitting the VLC frame via VLC at step S680.

In accordance with the present invention, the apparatus and method for providing location information are capable of transmitting indoor location information via VLC using an existing lighting control network without changing existing network components.

As described above, the optimum embodiments have been disclosed in the drawings and the specification. Although specific terms have been used herein, they have been used merely for the purpose of describing the present invention, but have not been used to restrict their meanings or limit the scope of the present invention set forth in the claims. Accordingly, it will be understood by those having ordinary knowledge in the relevant technical field that various modifications and other equivalent embodiments can be made. Therefore, the true ranges of protection of the present invention should be defined based on the technical spirit of the attached claims.

What is claimed is:

1. An apparatus for providing indoor location information, comprising:
    a signal reception unit configured to receive a lighting control frame from a lighting control device;
    a global positioning system (GPS) data reception unit configured to receive location data from GPS satellites:
    a frame generation unit configured to generate a location data frame by extracting a location of an illumination light stored in a lighting arrangement storage unit, modifying the location data and adding a header to the modified location data;
    a scheduling unit configured to schedule the lighting control frame or the location data frame; and
    a signal transmission unit configured to transfer the lighting control frame or the location data frame to the corresponding illumination light based on results of the scheduling of the scheduling unit.

2. The apparatus of claim 1, wherein the header comprises a lighting control network protocol ID of an illumination light extracted by the lighting arrangement storage unit.

3. The apparatus of claim 1, wherein the lighting arrangement storage unit includes information about physical installation locations of all illumination lights present on a lighting control network.

4. The apparatus of claim 1, wherein the frame generation unit, if the GPS data reception unit has received location data, checks whether its coordinates have been updated, and generates a different location data frame based on results of the checking.

5. The apparatus of claim 4, wherein the frame generation unit, if the coordinates have been updated, generates the location data frame by calculating a latitude and a longitude based on the installation location of the illumination light, modifying the location data based on results of the calculation, and adding a header to the modified location data.

6. The apparatus of claim 4, wherein the frame generation unit, if the coordinates have not been updated, extracts a time value from the location data, and generates a time synchronization frame using the time value.

* * * * *